US011108690B2

(12) United States Patent
Comeras et al.

(10) Patent No.: US 11,108,690 B2
(45) Date of Patent: Aug. 31, 2021

(54) ROUTER METHODS AND APPARATUS FOR MANAGING MEMORY FOR NETWORK OVERLAY ROUTES WITH FALLBACK ROUTE SUPPORT PRIORITIZATION

(71) Applicant: Cisco Technology, Inc., San Jose, CA (US)

(72) Inventors: Marc Portoles Comeras, Mountain View, CA (US); Alberto Rodriguez Natal, Mountain View, CA (US); Vina Ermagan, San Francisco, CA (US); Reshad Rahman, Ottawa (CA); Johnson Leong, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/118,709

(22) Filed: Aug. 31, 2018

(65) Prior Publication Data

US 2020/0076730 A1 Mar. 5, 2020

(51) Int. Cl.

| | |
|---|---|
| ***H04L 12/715*** | (2013.01) |
| ***H04L 12/46*** | (2006.01) |
| ***H04L 12/707*** | (2013.01) |
| ***H04L 12/743*** | (2013.01) |
| ***H04L 12/747*** | (2013.01) |

(52) U.S. Cl.
CPC .......... *H04L 45/64* (2013.01); *H04L 12/4633* (2013.01); *H04L 45/22* (2013.01); *H04L 45/7457* (2013.01)

(58) Field of Classification Search
CPC ..... H04L 45/64; H04L 12/4633; H04L 45/22; H04L 45/7457; H04L 370/216
See application file for complete search history.

(56) References Cited

U.S. PATENT DOCUMENTS 6,857,026 B1 * 2/2005 Cain .................... H04L 45/00 370/389
8,687,621 B2 * 4/2014 Shah .................... H04L 45/00 370/255
8,750,144 B1 6/2014 Zhou et al.
(Continued)

OTHER PUBLICATIONS

International Search Report and Written Opinion issued in PCT/US2019/048374 dated Oct. 17, 2019 ( 13 pps.).

*Primary Examiner* — Kwang B Yao
*Assistant Examiner* — Xuan Lu
(74) *Attorney, Agent, or Firm* — Merchant & Gould P.C.

(57) ABSTRACT

A method and a router device for managing memory for network overlay routes with fallback route support prioritization may be provided. A network overlay route as a candidate network overlay route may be obtained at a router for storage in a memory. The memory may store a plurality of network overlay routes for forwarding user plane traffic in a network. An assessment for storage of the candidate network overlay route based on a priority level indicator of the candidate network overlay route may be performed. The priority level indicator may be indicative of a fallback route support level of the candidate network overlay route in the router. Based on the assessment, at least one of the following may be performed: adding the candidate network overlay route to the memory and refraining from adding the candidate network overlay route to the memory.

20 Claims, 12 Drawing Sheets

(56) References Cited

U.S. PATENT DOCUMENTS

| | | | | |
|---|---|---|---|---|
| 8,990,492 | B1 * | 3/2015 | Zhou | G06F 17/00 711/105 |
| 9,419,855 | B2 * | 8/2016 | Ganichev | H04L 49/35 |
| 2009/0304007 | A1 * | 12/2009 | Tanaka | H04L 12/4645 370/395.53 |
| 2013/0329605 | A1 * | 12/2013 | Nakil | H04L 41/0668 370/255 |
| 2014/0204742 | A1 * | 7/2014 | Pandit | H04L 47/263 370/231 |
| 2015/0263897 | A1 * | 9/2015 | Ganichev | H04L 49/35 370/254 |
| 2016/0072696 | A1 * | 3/2016 | He | H04L 45/021 370/254 |
| 2016/0080502 | A1 * | 3/2016 | Yadav | H04L 45/02 709/227 |
| 2016/0315849 | A1 * | 10/2016 | Murai | H04L 45/22 |
| 2017/0041209 | A1 * | 2/2017 | Joshi | H04L 45/64 |
| 2018/0062992 | A1 * | 3/2018 | Cohn | H04L 45/586 |

* cited by examiner

310A 504 506

| Precedence or Priority Level | Route Type |
|---|---|
| 1 | Route Type A |
| 2 | Route Type B |
| 3 | Route Type C |
| 4 | Route Type D |
| ⋮ | ⋮ |
| K | Route Type Z |

Priority Level Mapping or Stored Association

Priority level according to the route type's contribution or importance in supporting fallback routing { Network Overlay Route ⇨ Route Type ⇨ Priority Level }

| Precedence or Priority Level | Route Type | Notes |
|---|---|---|
| 1 | Default Path Route | This type of routes requires re-encapsulation support on the hardware platform use to form the backbone path |
| 2 | Prefix Redirection Route Type | This type of routes requires re-encapsulation support on all edge routers in the overlay fabric |
| 3 | Level 0 Route Type | These are route entries generated as a result of regular operation (e.g LISP)<br><br>When overlapping prefix logic is applied on the edge encapsulation router for any level K entries learned, level k+1 entries are pushed from the MS to the edge router |
| 4 | Level 1 Route Type | |
| ⋮ | ⋮ | |
| K | Level n overlay Route Type | |

FIG. 5B

ROUTER METHODS AND APPARATUS FOR MANAGING MEMORY FOR NETWORK OVERLAY ROUTES WITH FALLBACK ROUTE SUPPORT PRIORITIZATION

TECHNICAL FIELD

The present disclosure relates generally to methods and apparatus for managing memory in routers, and more particularly to router methods and apparatus for managing high-speed memory for the storage of network overlay routes based on fallback route support prioritization.

BACKGROUND

In network fabric deployments, such as those using Locator ID/Separation Protocol (LISP) for centralized control and management, data-plane devices learn network overlay routes "on-demand" from a central fabric control-plane entity. This process commonly implies using data-plane traffic as signaling to obtain the on-demand forwarding routes. Once learned, data-plane devices cache the forwarding network overlay routes in high-speed memory.

Typically, the high-speed memory is a relatively costly, limited-size memory which needs to be conserved. For example, the high-speed memory may be a ternary content-addressable memory (TCAM), a static random access memory (SRAM), or the like.

In advanced LISP fabrics, such as software-defined (SD) access (SDA), control-plane mechanisms may also install additional network overlay "fallback routes" in the high-speed memory. These fallback routes are required to support different features in the fabric while ensuring reachability and routing convergence. Some examples of fallback routes are default routes, prefix redirection routes for mobility, and overlapping prefix routes.

Unfortunately, the very formation and distribution of these extra fallback routes may be compromised when the system is being challenged. This is true both when forming the core backup path as well as when installing additional routes that guarantee routing convergence. Fallback routes have to compete for memory space with each other as well as with "regular" overlay routing entries in the encapsulating device. Some fallback routes may be removed from the memory when space is running low. This is especially likely if the fallback routes are not being actively used to forward traffic. The removal of these entries may lead to traffic disruption, flow detouring, and/or packet loss.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5B are illustrative examples of stored associations or mappings between network overlay route types and priority level indicators, where priority levels are established in accordance with the route type's contribution or importance in supporting fallback routing.

Figure 1A:
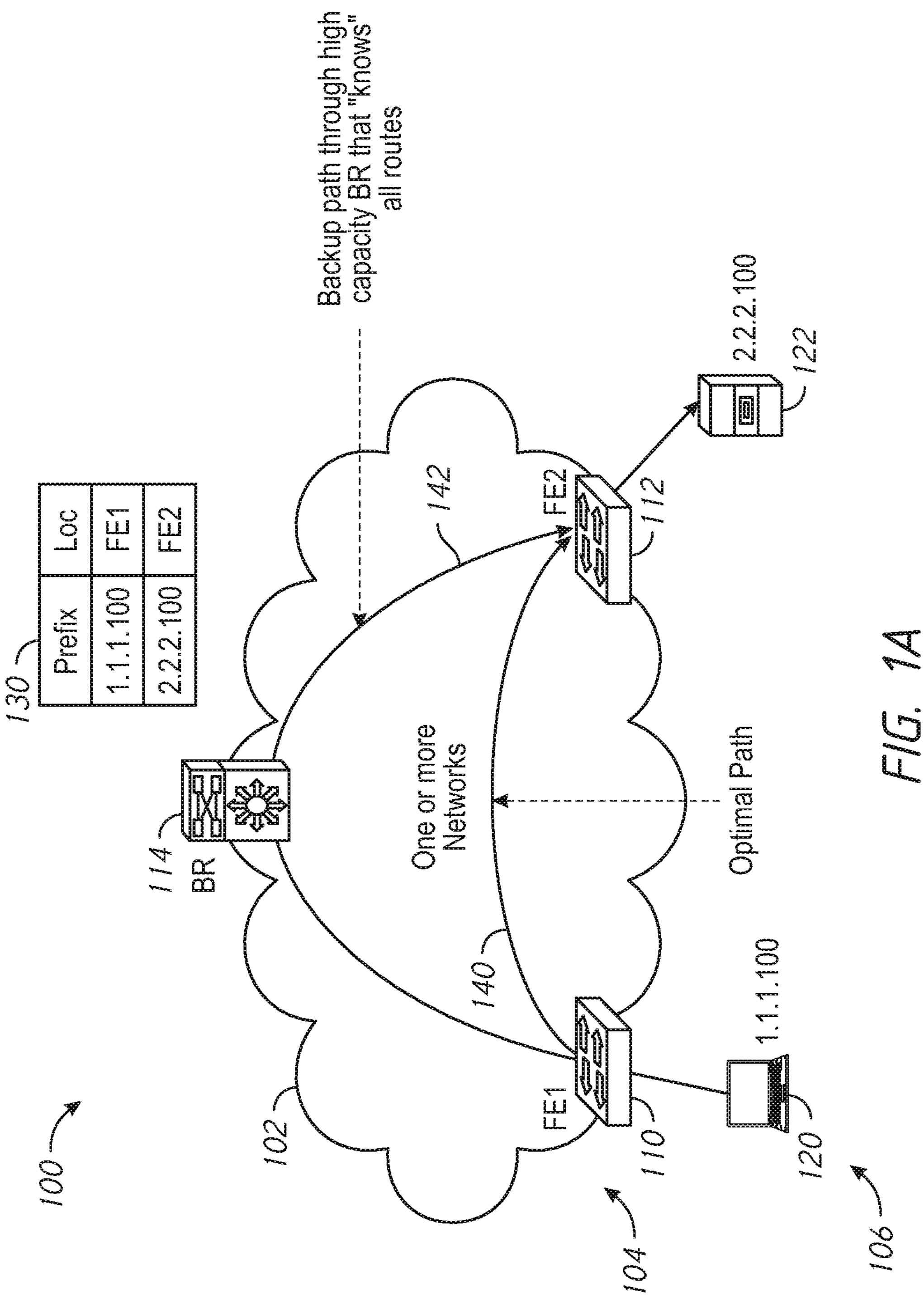
FIGS. 1A-1B are illustrative representations of a network infrastructure arrangement in one or more networks within which the techniques of the present disclosure may be provided, which includes a plurality of routers which may be configured to provide one or more network overlays with fallback or backup routes (e.g. a default route)

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Router methods and apparatus for managing high-speed memory for the storage of network overlay routes using fallback route support prioritization are described herein.

In one illustrative example, a router may include one or more processors and a high-speed memory, where the one or more processors are configured to perform a network overlay protocol for providing a network overlay in a network and the high-speed memory is for storing a plurality of network overlay routes for forwarding user plane traffic in the network. The high-speed memory may be a ternary content-addressable memory (TCAM), a static random access memory (SRAM), or the like. A new network overlay route may be received or obtained as a candidate for storage in the memory. At this time, the router may be in a state or condition to conserve memory space (e.g. memory full or near full). An assessment for storage of the candidate network overlay route may therefore be performed.

Each route may be associated with a respective one of a plurality of priority level indicators indicative of a "fallback route" support level of the route. Specifically, each route may be classifiable into one of a plurality of different route types, where each route type may be mapped to or associated with a respective one of the plurality of priority value indicators indicative of the fallback route support level of the route type. Here, the assessment for storage may be based at least on a priority level indicator of the candidate route relative to at least some of the priority level indicators of at least some of the stored routes. For example, when the priority level indicator of the candidate route is greater than the priority level indicator of one of the stored routes, the stored route may be "evicted" or deleted from the memory so that the candidate route may be added to the memory.

With use of such a technique, the router may maintain storage of network overlay routes that optimize or maximum fallback route support in the router.

More detailed and alternative techniques and implementations are provided as described below.

Example Embodiments

A network overlay may employ software virtualization to create an additional layer of network abstraction on top of a physical network. Specifically, routers in the network may be configured to operate using a network overlay protocol to provide a network overlay. The protocol may be, for example, Locator ID/Separation Protocol (LISP); however, other suitable alternatives may be utilized, such as Virtual Extensible LAN (VXLAN), Enhanced Virtual Private Network (EVPN), Identifier Locator Addressing (ILA), or the like.

In LISP fabric deployments (i.e. those which use LISP for centralized control and management), data-plane devices learn network overlay routes "on demand" from a central fabric control-plane entity. This process commonly implies using data-plane traffic as signaling to obtain the "on-demand" forwarding routes. Once learned, data-plane devices cache the forwarding network overlay routes in their high-speed memory. Typically, the high-speed memory is a relatively costly, limited-size memory which needs to be conserved. For example, the high-speed memory may be a ternary content-addressable memory (TCAM), a static random access memory (SRAM), or the like.

In advanced LISP fabrics, such as software-defined (SD) access (SDA), control-plane mechanisms may install extra network overlay "fallback routes" in the high-speed memory of the data-plane nodes. These fallback routes are required to support different features on the fabric while ensuring reachability and routing convergence, and preventing packet drops due to incomplete routing information. Some examples of fallback routes are default routes, "dynamic" prefix redirection routes for mobility, and prefix overlay routes (also referred to as specific versus-less specific routes).

Unfortunately, the very formation and distribution of these extra overlay routes may be compromised when the system is being challenged. This is true both when forming the core backup path as well as when installing additional routes that guarantee routing convergence. Fallback routes have to compete for memory space with each other as well as with "regular" overlay routing entries in the encapsulating device. Some fallback routes may be removed from the memory when space is running low. This is especially likely if they are not being actively used to forward data-plane traffic. The removal of these entries may lead to undesirable traffic disruption, flow detouring, and/or packet loss.

Accordingly, what is established is a priority order for overlay routes together with one or more associated mechanisms that provide or even guarantee the existence of appropriate fallback routes even in adverse network conditions. At least of the some techniques of the present disclosure may be "built" on top of a (scalable) fallback routing service which is equipped to provide backup routes to hosts and prefixes that are part of the network overlay fabric. Fallback routes may stretch the path between hosts, but advantageously used to guarantee traffic flow continuity. A fallback routing service may be provided with a (possible) participation of all network overlay routers in the network. Depending on the particular use-case, different types of routes may contribute to forming and directing traffic through fallback routes. When fully supported, fallback routes may guarantee end-to-end delivery of traffic in an overlay fabric.

Figure 1B:
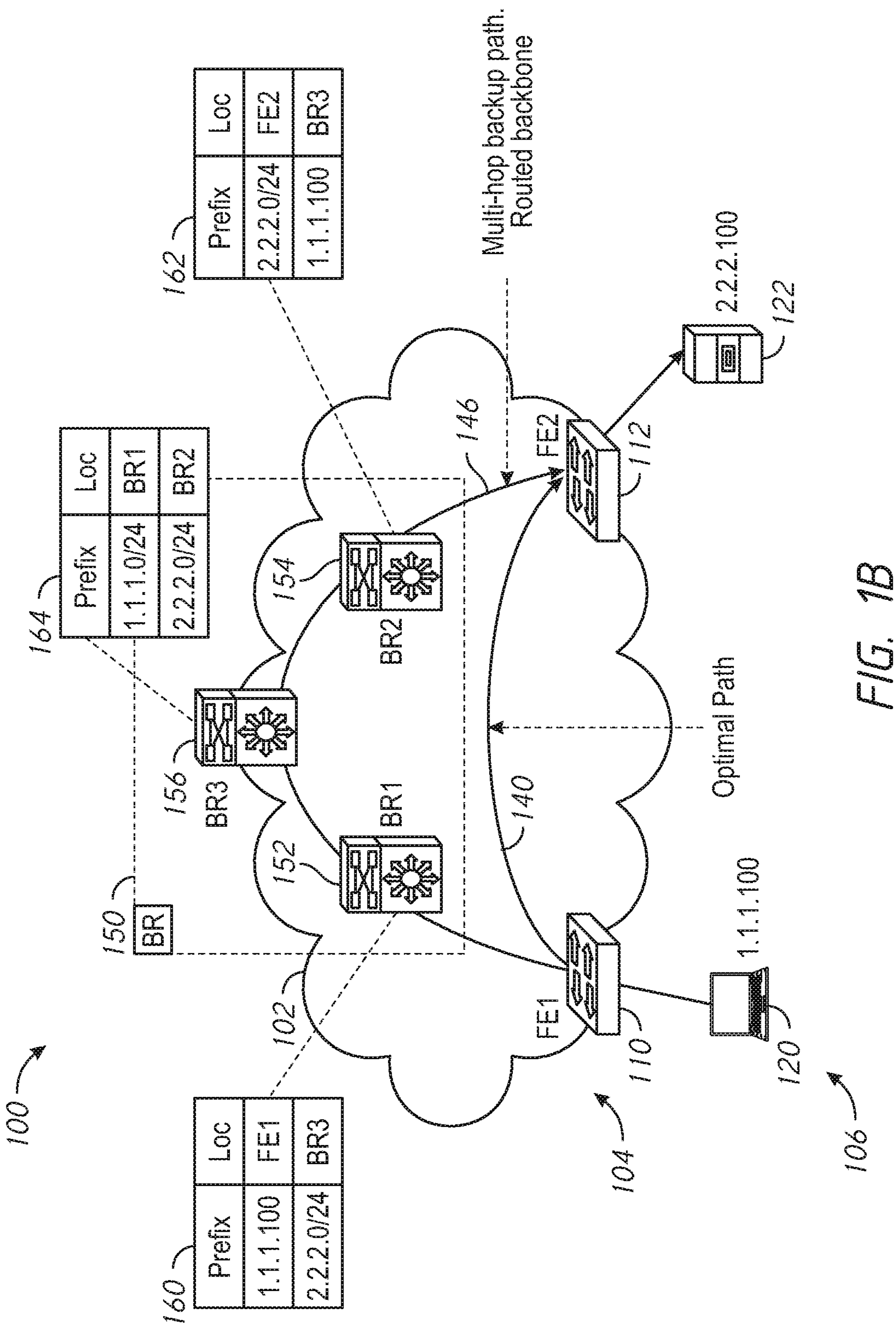

To better illustrate, FIGS. 1A-1B are illustrative representations of a network infrastructure arrangement 100 within which at least some implementations of the present disclosure may be provided. FIGS. 1A-1B may be used to describe, amongst other things, fallback routes referred to as "default routes."

Network infrastructure arrangement 100 of FIG. 1A includes a plurality of routers 104 and a plurality of endpoints (or hosts) 106 connected in one or more networks 102. Routers 104 may include routers 110, 112, and 114, and endpoints 106 may include endpoint 120 connected to router 110 and endpoint 122 connected to router 112. Router 110 may be a fabric edge router (designated as "FE1"), and router 112 may also be a fabric edge router (designated as "FE2"). Router 114 may be a border router (designed as "BR"). Endpoint 120 which is a computer device (e.g. a desktop or laptop computer) may be assigned with a prefix or address of 1.1.1.100, and endpoint 122 which is a server may be assigned with a prefix or address of 2.2.2.100. Router 114 has a forwarding table 130 which includes a network overlay route for endpoint 120 corresponding to an endpoint-to-router mapping of 1.1.1.100@FE1 and a network overlay route for endpoint 122 corresponding to an endpoint-to-router mapping of 2.2.2.100@FE2.

One or more of the routers 104 in network 102 of FIG. 1A may be configured to provide a network overlay for communication amongst endpoints 106. A normal or "optimal" path 140 for communications between endpoints 120 and 122 may be provided (directly) between routers 110 and 112. On the other hand, a backup path 142 for communications between endpoints 120 and 122 may also be provided between routers 110 and 112 in an extended manner through router 114. Backup path 142 may be and/or be referred to as a default path. A default path can take many forms, depending on the devices available, etc. Here, router 114 which is a border router has (e.g. at all times) an updated path to all prefixes/hosts within its own fabric.

A default route or path may be established and used in order to protect flow continuity when the system is being challenged. The default path may set a backup route to all existing prefixes in the network and be used during route resolution processes as well as when the memory runs out of space. This strategy may protect the system when the interface between the routing elements and the centralized control is compromised, when forwarding resources are being exhausted (e.g. under a sweeping attack), and/or while regular overlay routes are being retrieved from centralized control in order to prevent traffic loss. This default path mechanism may involve the installation of a default overlay routing entry to send the traffic to the default path when no other suitable overlay route is available.

An alternative implementation of FIG. 1A is shown in FIG. 1B. FIG. 1B is the network architecture arrangement 100 of FIG. 1A where the single border router is replaced with a plurality of border routers 150. The plurality of routers 150 include a border router 152 ("BR1"), a border router 154 ("BR2"), and a border router 156 ("BR3"). As indicated, router 152 ("BR1") has a forwarding table 160 which includes a network overlay route for endpoint 120 corresponding to an endpoint-to-router mapping of 1.1.1.100@FE1 and a network overlay route for router 156 corresponding to an endpoint-to-router mapping of 2.2.2.0/24@BR3; router 154 ("BR2") has forwarding table 162 which includes a network overlay route for router 156 ("BR3") corresponding to an endpoint-to-router mapping of 1.1.1.0/24@BR3 and a network overlay route for endpoint 122 corresponding to an endpoint-to-router mapping of 2.2.2.100@FE2; and router 156 ("BR3") has forwarding table 164 which includes a network overlay route for router 152 ("BR1") corresponding to an endpoint-to-router mapping of 1.1.1.0/24 @BR1 and a network overlay route for router 154 corresponding to an endpoint-to-router mapping of 2.2.2.0/24@BR2.

Thus, an overlay routed path having multiple participating routers 150 in FIG. 1B may serve as an (extended) overlay backbone with a path to every host/prefix in the overlay fabric. This implementation may be provided when using equipment with limited capabilities or when a routed backbone is desirable. This implementation may be particularly useful when deployed across campus, branch, and wide area network (WAN). As shown, backup path 146 is a default path across a multiple of routers 150 across the overlay fabric.

Figure 2A:
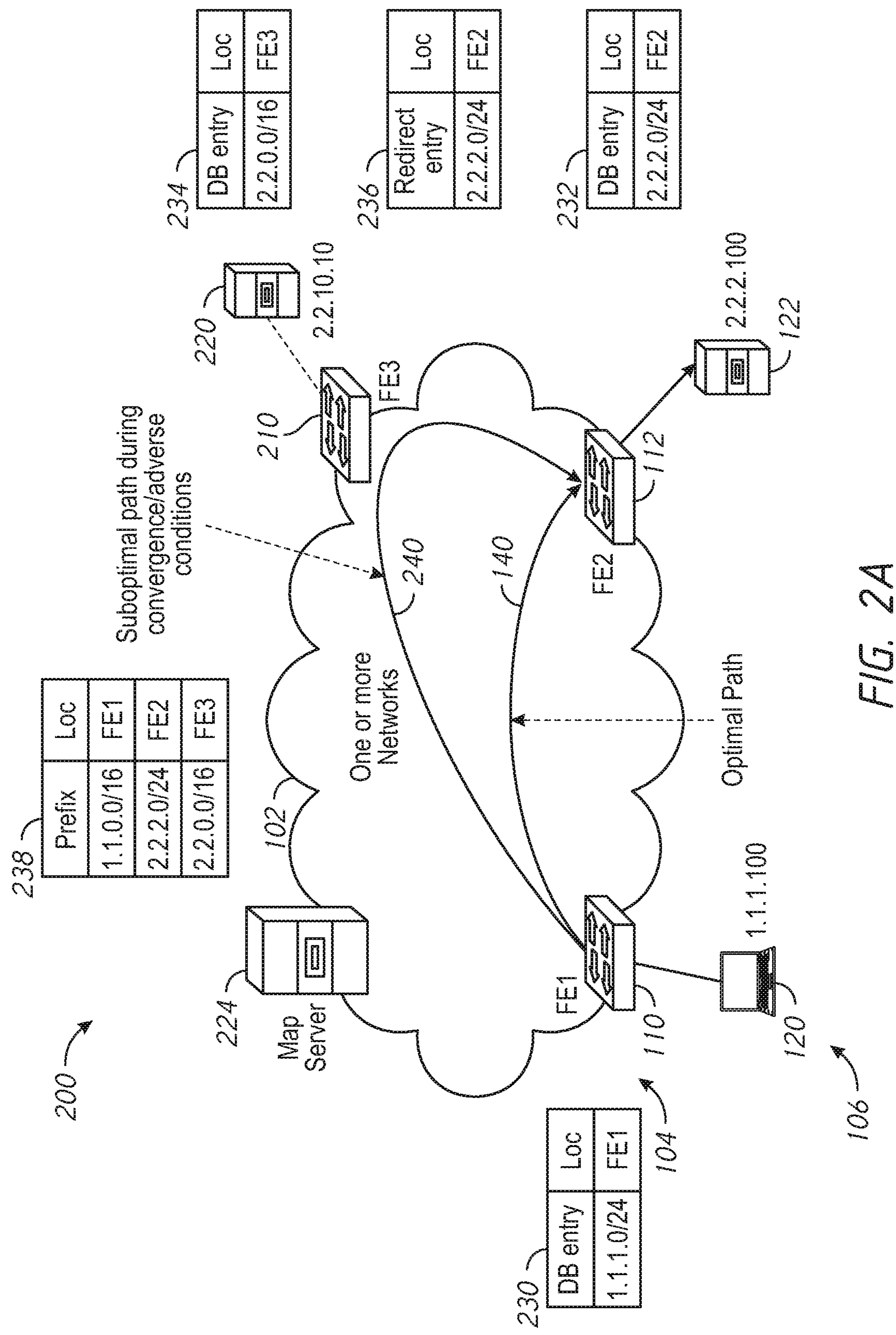
FIGS. 2A-2B are illustrative representations of a network infrastructure arrangement in one or more networks within which the techniques of the present disclosure may be provided, which also includes a plurality of routers which may be configured to provide one or more network overlays with fallback or backup routes (e.g. a prefix redirection route for mobility in FIG. 2A, and a parent prefix path in FIG. 2B)
Figure 2B:
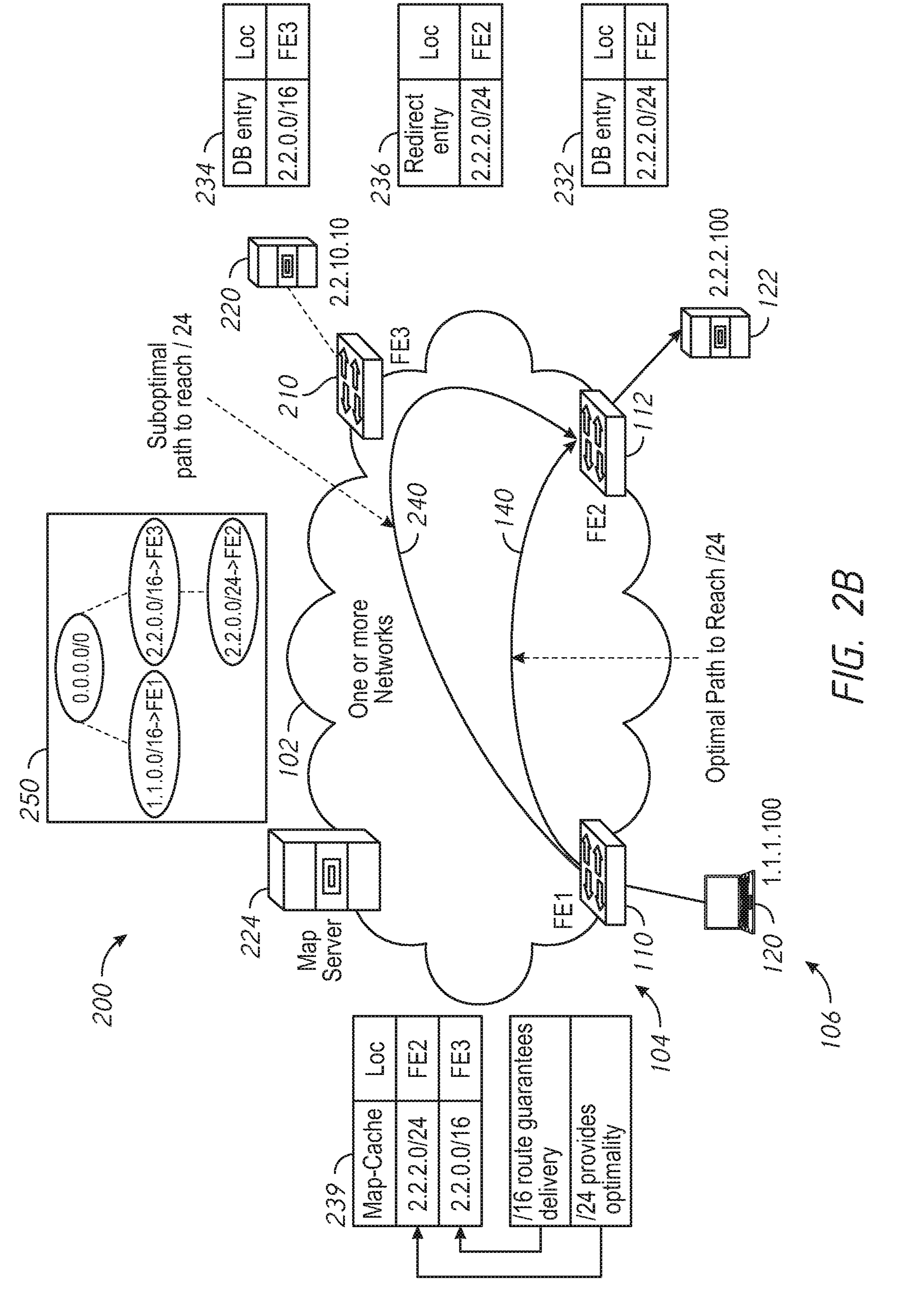

FIGS. 2A-2B are illustrative representations of a network infrastructure arrangement 200 within which at least some implementations of the present disclosure may be provided. FIG. 2A is similar to that shown in relation to FIG. 1, but where the border router is replaced with a router 210 which is a fabric edge router (designed as "FE3"). FIG. 2A is used to describe, among other things, a fallback route that may be referred to as a "dynamic" prefix redirection route for mobility; FIG. 2B is used to describe, among other things, a fallback route that may be referred to as an overlapping prefix route.

In FIG. 2A, one or more of the routers 104 in network 102 may be configured to provide a network overlay for communication amongst endpoints 106. The normal or "optimal" path 140 for communications between endpoints 120 and 122 may be provided (directly) between routers 110 and 112. On the other hand, a backup path 240 for communications between endpoints 120 and 122 may also be provided between routers 120 and 122 in an extended manner through router 210. In the example of FIG. 2A, backup path 240 may be or be referred to as a prefix redirection route used for mobility.

A map server 224 in network 102 has a database (DB) 238 for storing a plurality of network overlay routes. Note that a database entry 230 for locating endpoint 120 associated with 1.1.1.100 corresponds to 1.1.1.0/24 @FE1; a database entry 232 for locating endpoint 122 associated with 2.2.2.100 corresponds to 2.2.2.0/24 @FE2; and a database entry 234 for locating endpoint 220 associated with 2.2.0.0/16 corresponds to 2.2.0.0/16@FE3. Each stored network overlay route in DB 238 may be an endpoint-to-router mapping; for example, a network overlay route for endpoint 120 associated with 1.1.1.100 may correspond to an endpoint-to-router mapping of 1.1.0.0/16 @FE1; a network overlay route for endpoint 122 associated with 2.2.2.100 may correspond to an endpoint-to-router mapping of 2.2.2.0/24@FE2; and a network overlay route for endpoint 220 associated with 2.2.10.10 may correspond to an endpoint-to-router mapping of 2.2.0.0/16@FE3. Notably, a redirect entry 236 for optimal path 140 corresponds to an endpoint to 2.2.2.0/24 @FE2.

To support mobility events across the fabric, a centralized control-plane may install a re-encapsulation route or path at the original encapsulation edge of a host when the host moves. This serves to redirect traffic addressed to the host old location, towards the new location of the host. Thus, a redirection path may be installed in the router to support dynamic (mobile) prefixes. There are many solutions with different approaches to mobility and, typically, they involve installing prefix redirection routes pushed by the map server to specific edge routers. In general, routers that previously hosted a specific prefix may install a prefix redirection route to the new location of prefixes that have moved.

Accordingly, in FIG. 2A, a redirection strategy for dynamic prefixes is employed, where router 210 learns and installs a prefix redirection route to prefix 2.2.2.0/24 with destination FE2. This establishes a fallback route for traffic, received by router 210, that falls within the prefix 2.2.0.0/16 that is hosted by router 210 but destined to a host in range 2.2.2.0/24.

Dynamic fallback path formation as described above usually stems from the presence of overlapping prefixes hosted at different edge routers. The presence of overlapping prefixes has led to the design of multiple solutions that ensure that edge routers converge towards using optimal overlay routing paths to deliver traffic. One general solution involves the routers that host specific prefixes to install prefix redirection routes for Level+1 child prefixes in the registration tree. When the registration tree on an enterprise mapping system (e.g. "HTDB" in SDA nomenclature) contains registrations for multiple overlapping prefixes, the edge encapsulation nodes may end-up populating their forwarding tables with overlapping prefix routes, depending on traffic demands. In such a case, and when the previous two types of network overlay routes (i.e. default routes and prefix redirection routes) are supported, parent prefixes constitute valid fallback routes for their child prefixes.

In order to support overlapping prefix entries, a specific route or path may be installed in encapsulating devices that have cached overlapping, less-specific routes. This approach is performed to ensure that the traffic is correctly encapsulated with use of the most specific route. Thus, in other implementations, with reference to FIG. 2B, an alternative strategy is applied directly to router 110. Here, when router 110 learns prefix 2.2.0.0/16, it also receives the route for 2.2.2.0/24 which is pushed by map server 224. This ensures that a forwarding entry that covers traffic to more specific prefixes exists.

Note how router 110 ("FE1") has two overlay routes that deliver traffic to hosts in prefix range 2.2.2.0/24 behind router 112 ("FE2"). However, while the direct overlay route 2.2.2.0/24 follows optimal path 140, the overlay route 2.2.0.0/16 follows an extended path (i.e. backup path 240). Router 110 may take this as an opportunity when memory resources in router 110 are limited, as the backup path 240 towards 2.2.0.0/16 constitutes a fallback path to 2.2.2.0/24.

Accordingly, techniques of the present disclosure build on the observation that, by assigning priorities to network overlay routes in accordance with their fallback route support levels, the provision of a fallback routing service may be protected. In many scenarios, the fallback routing service may be protected even in the presence of challenging environments (e.g. during attacks or the like).

In some implementations, the techniques of the present disclosure relate to high-speed memory exhaustion and fallback routing protection for network overlay routes. Specifically, the techniques may include the eviction and insertion of network overlay routes in high-speed memory. Eviction, insertion, and/or dropping of network overlay routes may be based in the following considerations or factors, listed below in an exemplary order of relevance:

TABLE 1

| Considerations or factors for storage of network overlay routes (e.g. when router is in a state or condition to conserve space in high-speed memory). |
|---|
| Priority Order of Factors for Consideration in the Eviction, Insertion, and/or Dropping of Network Overlay Routes |
| Available Space in High-Speed Memory |
| Fallback Route Support Level |
| Current usage of the route (Idle vs. Non-idle) |
| Age of the Route (Older vs. Newer) |

Overlay routes may be installed in the memory while there is memory space, or when there is a lower priority overlay route that can be evicted from the memory. Any other eviction policy (e.g. evict idle routes first) may be respected within each priority level (i.e. fallback route support level). However, a lower priority route may be evicted with higher preference even when there are higher priority routes that are not being used. In the case of a tie of routes having the same priority, older routes have priority over newer ones (i.e. the newer one may be dropped).

Figure 3:
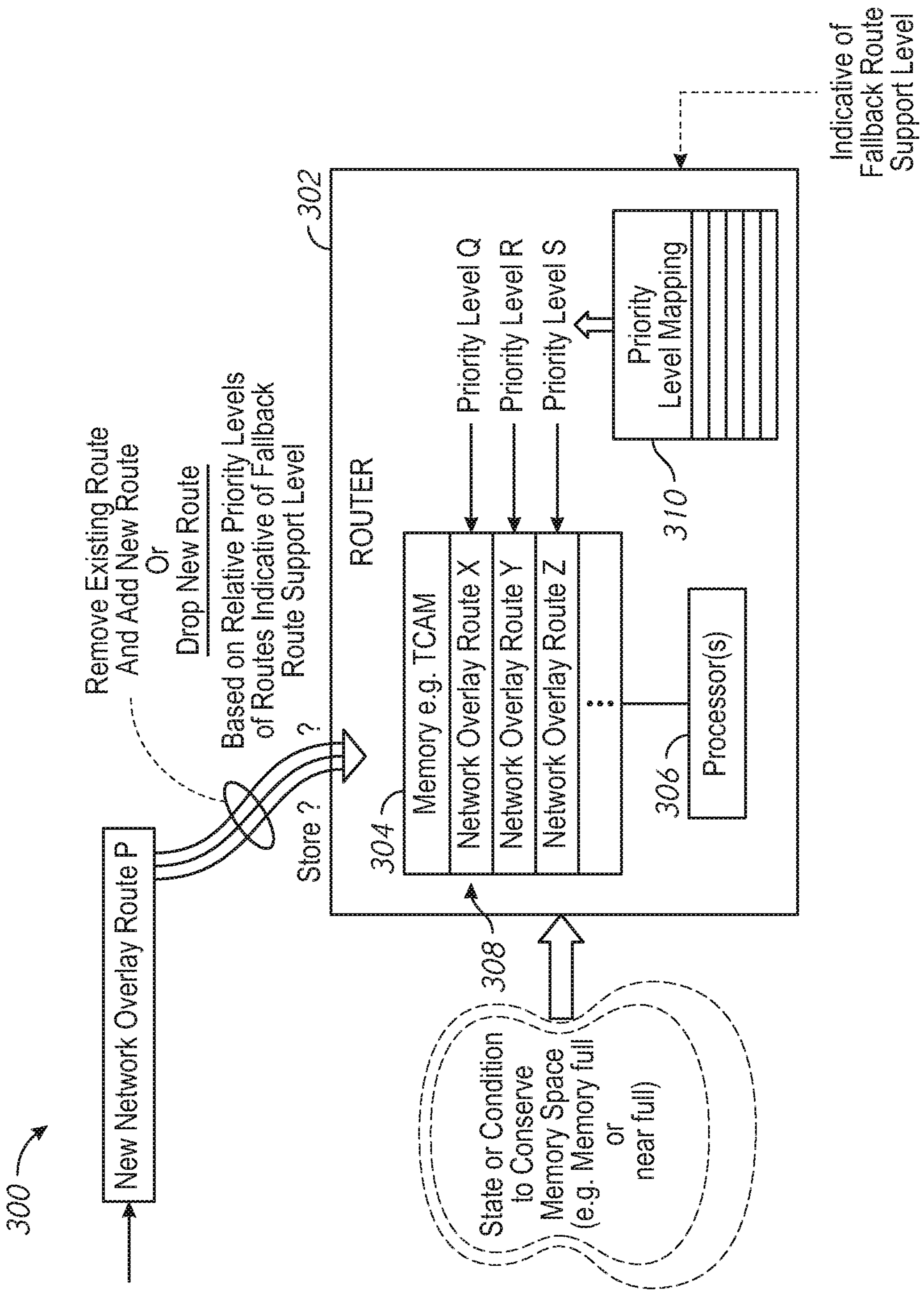
FIG. 3 is an illustrative representation of a router operative to provide memory management for network overlay routes according to some implementations of the present disclosure.

FIG. 3 is an illustrative representation of a router 302 for operation in accordance with some implementations of the present disclosure. Router 302 includes a high-speed memory 304 (e.g. TCAM, SRAM, or the like) and one or more processors 306 configured to operate according to a network overlay protocol (e.g. LISP, VXLAN, EVPN, ILA, or the like) to facilitate communications in one or more networks via a network overlay. More specifically, router 302 may be referred to as a tunnel router configured to operate according to a network overlay tunneling protocol for facilitating communications via network overlay tunnels. Memory 304 is for use in storing a plurality of network overlay routes 308 (e.g. network overlay routes X, Y, and Z) for forwarding user plane traffic in the one or more networks.

In FIG. 3, each one of network overlay routes may be associated with a corresponding one of a plurality of priority level indicators (e.g. a priority levels Q, R, and S associated with network overlay routes X, Y, and Z, respectively). A priority level for a network overlay route may be pre-established according to the route type's "known" fallback route support level. This predetermined priority level may be provided in and identified from a stored mapping 310 (or priority level mapping) between priority level indicators and route types. See e.g. FIG. 5A which shows a mapping table 310A, where precedence or priority level is indicated in a first column 504 and its associated route type is indicated in a second column 506. Here, the route type of a network overlay route may be determined based on an examination of network overlay route data of the route (e.g. route type "B"), and the determined route type may be used as an input to the stored mapping to identity the appropriate priority level indicator (e.g. priority level "2").

With reference back to FIG. 3, a new network overlay route "P" is received and considered as a candidate for storage in the memory. However, the router may be in a state or condition to conserve memory space (e.g. memory is full or near full). An assessment for storage of the candidate network overlay route may therefore be performed. The assessment may be performed based at least on a priority level indicator of the candidate network overlay route which is indicative of its fallback route support level in the router. In some implementations, the assessment may be performed based at least on a priority level indicator of the candidate route relative to at least some of the priority level indicators of at least some of the stored routes in the memory. Based on the assessment, the candidate network overlay route may be added to the memory or dropped. For example, one of the stored network overlay routes having a lesser fallback route support level may be removed from memory (i.e. "evicted") and the candidate network overlay route having a greater fallback route support level may be added to the memory. This process may be repeated or performed in a regular fashion, such that the memory is regularly filled with routes that optimize or maximize the fallback route support level in the router.

Figure 4A:
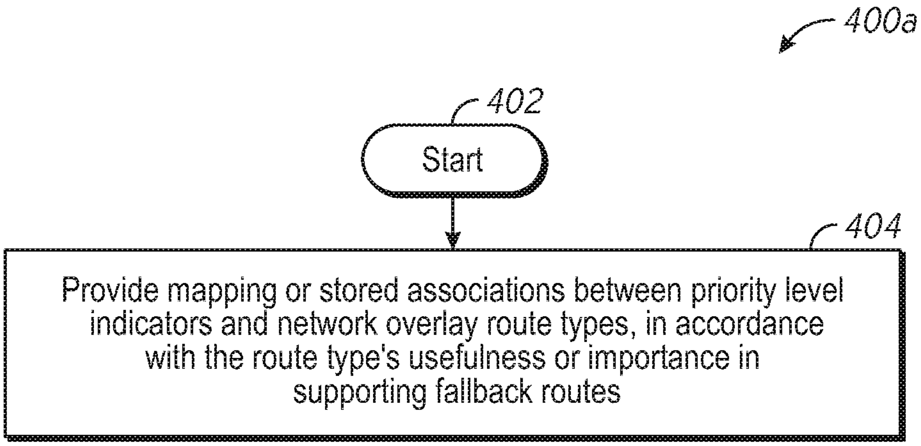
FIGS. 4A-4B are flowcharts for describing router operating methods for use in memory management for network overlay routes according to some implementations of the present disclosure.
Figure 4B:
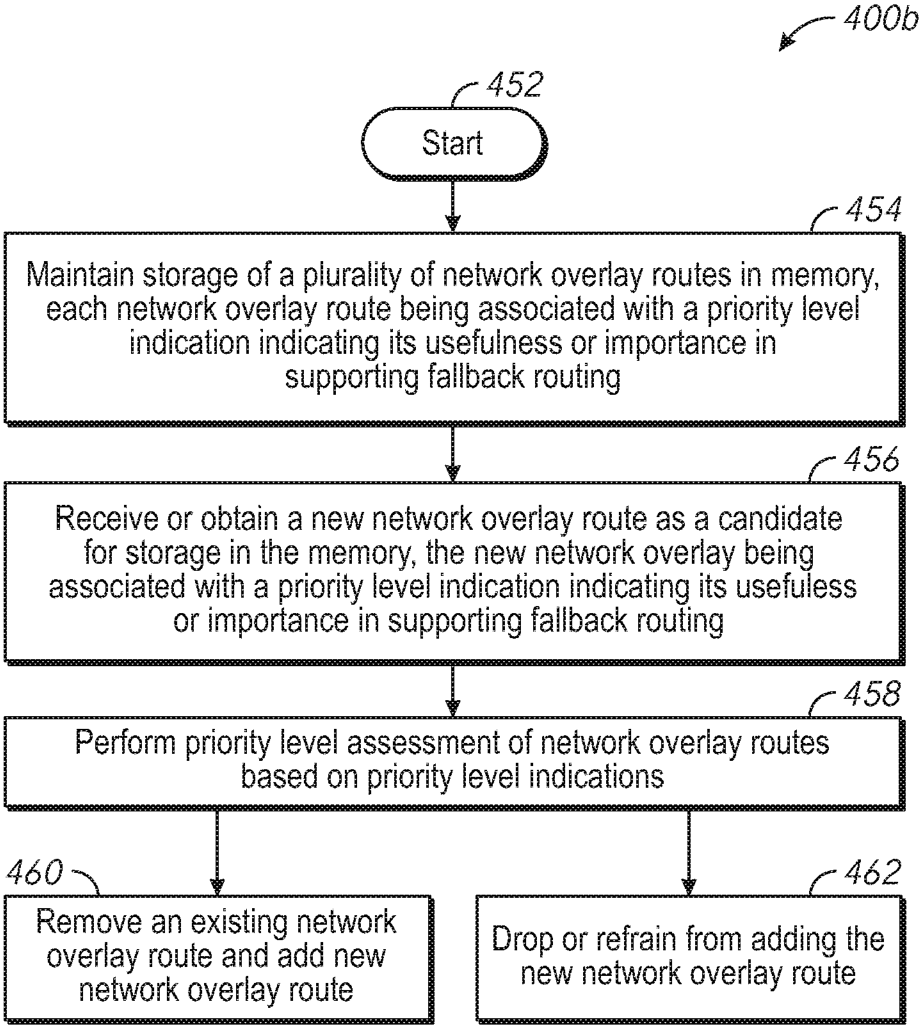

FIGS. 4A-4B are flowcharts 400A and 400B for describing router operating methods for use in memory management for network overlay routes according to some implementations of the present disclosure. The router operating methods may be executed separately or together in a router or routing device. The router may include a high-speed memory (e.g. TCAM, SRAM, or the like) and one or more processors configured to operate according to a network overlay protocol (e.g. LISP, VXLAN, EVPN, ILA, or the like) to facilitate communications in one or more networks via a network overlay. The router may be referred to as a tunnel router configured to operate according to a network overlay tunneling protocol for facilitating communications via network overlay tunnels. Each method may be embodied as a computer program product including a non-transitory computer readable medium and instructions stored in the computer readable medium where the instructions are executable on one or more processors of the router or routing device for performing the steps of the method.

Beginning at a start block 402 of a flowchart 400A of FIG. 4A, the router may provide a stored mapping or associations between priority level indicators and route types (step 404 of FIG. 4A). See e.g. a mapping table 310A of FIG. 5A where precedence or priority level is indicated in a first column 504 and its associated route type is indicated in a second column 506. Priority levels for routes may be pre-established or set according to the route type's usefulness or importance in supporting fallback routes. As each network overlay route may be associated with, classified as, and/or identified to be a particular one of the route types, each route may be further associated and/or identified with a priority level indicator indicative of its fallback route support level based on the route type associated with the route. The stored mapping or associations may be used for identifying a priority level indicator of a network overlay route based on its determined route type.

Now with respect to FIG. 4B, continuing at a start block 452 of a flowchart 400B, the router maintains storage of a plurality of network overlay routes in the memory (step 454 of FIG. 4B). Each stored route may be associated with one of a plurality of priority level indicators, assigned to the stored routes in accordance with "fallback route" support levels of the routes. A new network overlay route may be received or obtained, considered as a candidate for storage in the memory (step 456 of FIG. 4B). The candidate route may be associated with a priority level indicator assigned in accordance with the route's "fallback route" support level.

At this time, the router may be in a state or condition to conserve memory space (e.g. memory is full or near full). An assessment for storage of the candidate network overlay route may therefore be performed (step 458 of FIG. 4B). The assessment may be performed based at least on the priority level indicator of the candidate network overlay route and at least some of the priority level indicators of at least some of the stored network overlay routes. Based on the assessment, the candidate network overlay route may be added to the memory (step 460 of FIG. 4B) or dropped (step 462 of FIG. 4B). In some implementations of step 460, one of the stored network overlay routes may be removed from memory (i.e. "evicted") and the candidate network overlay route may be added to the memory.

As described, each network overlay route may be associated and/or identified with its own priority level indication according to its usefulness or importance in supporting fallback routing. In step 458 of FIG. 4B, the assessment may be based on the priority level indicator associated with the candidate route relative to at least some of the priority level indicators associated with the stored routes. For example, if the priority level indicator of the candidate network overlay route is greater than that of any one of stored network overlay routes, one of the stored network overlay routes may be removed from memory ("evicted") and the candidate network overlay route may be added to the memory.

Each of the stored network overlay routes may be further associated with a route age level indicator (e.g. the age of the route, where an older age route is given a higher priority than a younger age route). Thus, in some implementations, the assessment in step 458 of FIG. 4B may be further based on one or more route age level indicators associated with at least some of the stored network overlay routes. In addition, each of the stored network overlay routes may be further associated with a route usage level indicator (e.g. idle or non-idle state of the route, where an idle route is given a lower priority over a non-idle route). Thus, in some implementations, the assessment in step 458 of FIG. 4B may be further based on one or more route usage level indicators associated with at least some of the stored network overlay routes. Note that some or all of these additional indicators may be used together with the priority level indicators for fallback route support, especially as "tie breakers" when the priority level indicators for fallback route support between routes are the same.

In more detailed implementations, the stored mapping between priority level indicators and route types may be based on a mapping table 310B of FIG. 5B. In the mapping table 310B of FIG. 5B, precedence or priority level is indicated in a first column 514 and its associated route type is indicated in a second column 516. Descriptions of the relationships are provided in a notes section in a third column 518. In FIG. 5B, a priority level indicator of "1" corresponds to a route type of "default path"; priority level indicator of "2" corresponds to a route type of "prefix redirection type"; priority level indicator of "3" corresponds to a route type of "Level 0" route type; priority level indicator of "4" corresponds to a route type of "Level 1" route type; etc. as provided for in mapping table 310B. Routes categorized as "Level 0, Level 1, . . . Level n" refer to their level in the registration tree that a centralized mapping system (MS) maintains.

In the stored mapping 310B, the route type corresponding to "default path route" (row 1) relates to a type of route that requires re-encapsulation support on the hardware platform used to form the backbone path (see e.g. FIG. 1B). The route type corresponding to "prefix redirection route" (row 2) relates to a type of route that requires re-encapsulation support on all edge routers in the overlay fabric. For route types corresponding to "Level 0," "Level 1," "Level 2," etc., these relate to route entries generated as a result of normal operation (e.g. using LISP); when overlapping prefix logic is applied on an edge encapsulation router, for any level k entries learned, level k+1 entries are pushed from the MS to the edge router.

Figure 6:
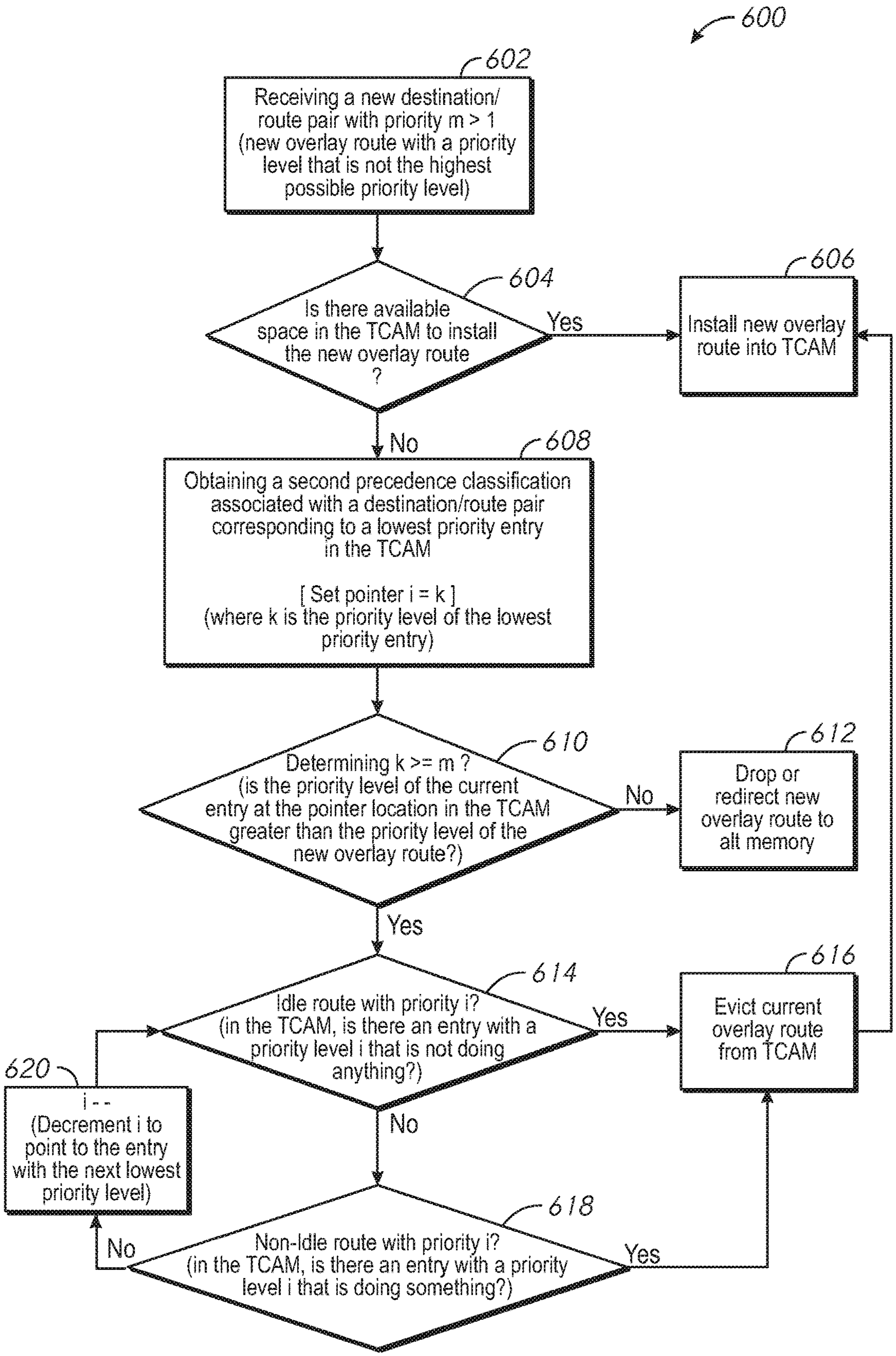
FIG. 6 is a flowchart for describing a lower-level router operating method for use in memory management for network overlay routes according to some implementations of the present disclosure.

FIG. 6 is a flowchart 600 for describing a lower-level, router operator method for use in memory management for network overlay routes according to some implementations of the present disclosure. The router operating methods may be executed in a router or routing device. The router may include a high-speed memory and one or more processors configured to operate according to a network overlay protocol (e.g. LISP, VXLAN, EVPN, ILA, or the like) to facilitate communications via a network overlay in one or more networks. The router may be referred to as a tunnel router configured to operate according to a network overlay tunneling protocol for facilitating communications via network overlay tunnels. In the example of FIG. 6, the high-speed memory is indicated as a TCAM, however any other suitable high-speed memory (e.g. SRAM) may be utilized. Each method may be embodied as a computer program product including a non-transitory computer readable medium and instructions stored in the computer readable medium, where the instructions are executable on one or more processors of the router or routing device for performing the steps of the method.

The method of FIG. 6 may make use of a stored mapping between route types and priority level indications, using a pre-established numbering scheme or ordering. The pre-established numbering scheme or ordering is such that, the lower the number of priority, the higher the priority level; and conversely, the higher the number of priority, the lower the priority level ("1"=highest priority; "2"=lower priority; . . . "5"=lowest priority). For example, the stored mapping used in relation to FIG. 6 may be the stored mapping 310B in FIG. 5B.

In FIG. 6, a new network overlay route or "destination/route pair" is received or obtained as a candidate for storage in the TCAM (step 602 of FIG. 6). The candidate route is associated with a priority level indicator "m", where m>1 (i.e. m is not the highest priority level). It is identified whether there is available space in the TCAM to install the candidate route (step 604 of FIG. 6). If there is available space in the TCAM ("Yes" in step 604), the candidate route is installed in the TCAM (step 606 of FIG. 6). On the other hand, if there is little or no available space in the TCAM ("No" in step 604), an assessment for storage of the candidate route may be performed. Here, a pointer or index "i" to a priority level indicator associated with an existing, stored network overlay route in the TCAM may be used. More specifically, the pointer "i" may be set to point to (and therefore obtain) a priority level indicator "k" of a stored route having the lowest priority in the TCAM (step 608 of FIG. 6).

In the assessment, it is determined whether k≥m; that is, whether the lowest priority entry in the TCAM has a priority level indicator that is greater than (i.e. a lower priority than) or equal to that of the candidate route (step 610 of FIG. 6). If k>m as identified in step 610 (i.e. the stored route has a priority level indicator that is greater than (i.e. a lower priority than) that of the candidate route), then the candidate route is dropped or redirected to alternative memory (step 612 of FIG. 6). If k is not greater than m, but is equal to m, as identified in step 610, then it is determined whether any one of the stored routes associated with the same priority level is "idle" (step 614 of FIG. 6). If "no" in step 614, then it is determined whether any one of the stored routes associated with the same priority level is "non-idle" (step 618 of FIG. 6). If "yes" in either step 614 or step 618, then the idle route is evicted from the TCAM (step 616 of FIG. 6) and the new route is installed in the TCAM (step 606 of FIG. 6). If no in step 618, then the pointer "i" is decremented so that k=k−1 (i.e. higher priority stored routes are then considered) (step 620 of FIG. 6) where the method continues at step 614. Note that, in the technique of FIG. 6, the age of the stored routes may be considered in the similar or comparable manner.

What may be achieved in the techniques of the present disclosure (e.g. especially in relation to FIG. 6), is that (most) any new route to be considered as a candidate for storage in the TCAM may replace any existing stored route that has a lesser "fallback route support" priority than the candidate route, such that the TCAM is regularly filled with routes to optimize or maximize the fallback route support in the router.

FIGS. 7A-7D are illustrative examples of different scenarios associated with the techniques described above (e.g. in relation to FIG. 6). In these examples, a stored mapping between route types and priority level indicators may be used as described above, and this stored mapping may be the stored mapping 310B of FIG. 5B. In the examples of FIGS. 7A-7D, the high-speed memory is again indicated as a TCAM, but any other suitable high-speed memory (e.g. SRAM) may be utilized.

Figure 7A:
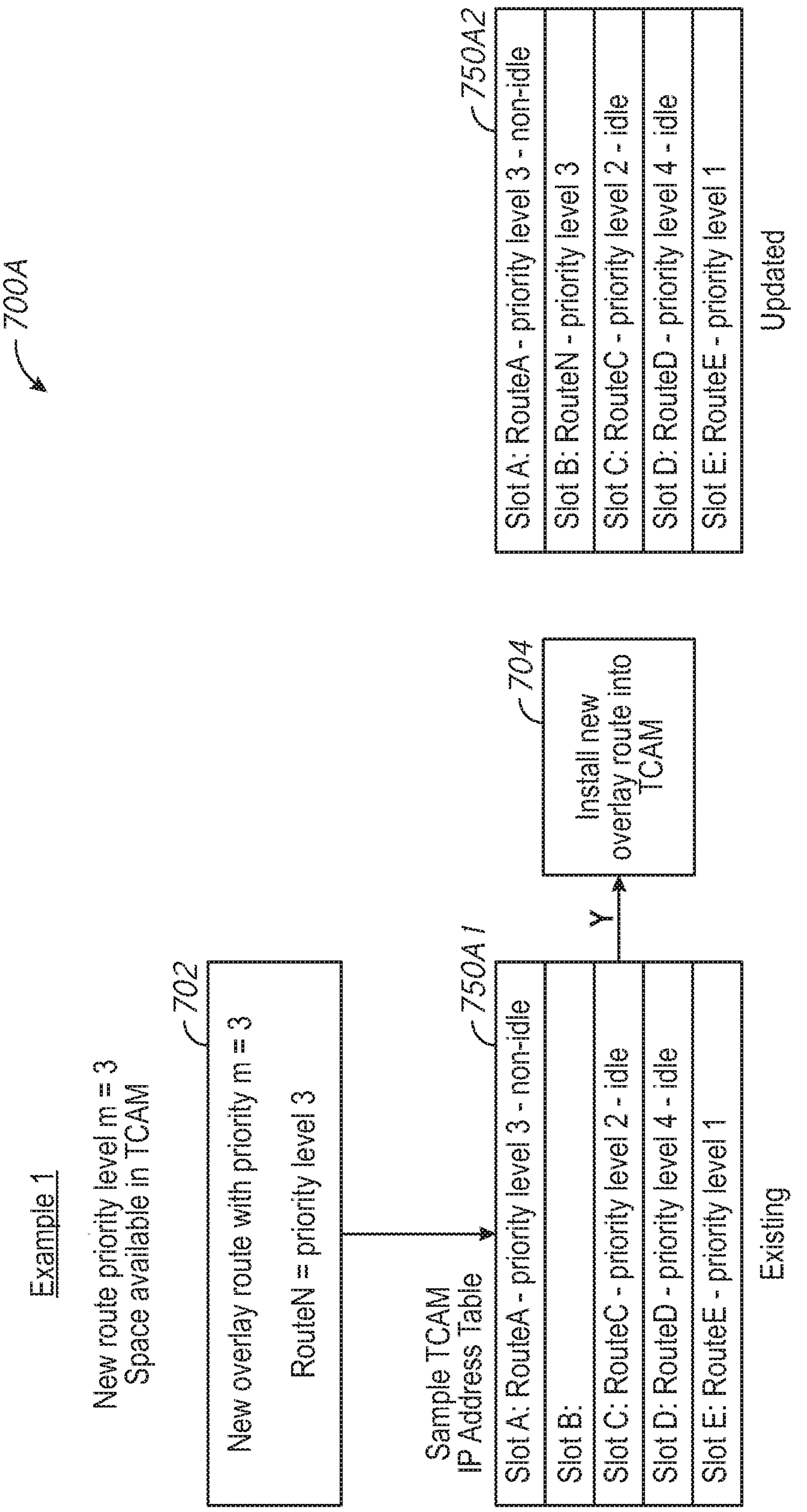
FIGS. 7A-7D are illustrative examples of different scenarios associated with the technique described in relation to FIG. 6.

In FIG. 7A, an illustrative diagram of a case scenario 700A for TCAM management of network overlay routes is shown. As shown, TCAM 750A1 includes a memory space or slot A having a Route A with a priority level indicator of "3" and a "non-idle" status; a slot B which is empty; a slot C having a Route C with a priority level indicator of "2" and an "idle" status; a slot D having a Route D with a priority level indicator of "4" and an "idle" status; and a slot E having a Route E with a priority level of "1." A new network overlay route "N" may be received or obtained as a candidate for storage in TCAM 750A1 (step 702 of FIG. 7A). The candidate route has a priority value indicator of m="3" which is less than many of the other priority value indicators in TCAM 750A1. Also, there is no state or condition for conserving memory space in the TCAM. Based on the assessment, the new route is installed in the TCAM (step 704 of FIG. 7A). Specifically, the new route is installed in the TCAM in slot B; an updated TCAM 750A2 is therefore shown in FIG. 7A.

Figure 7B:
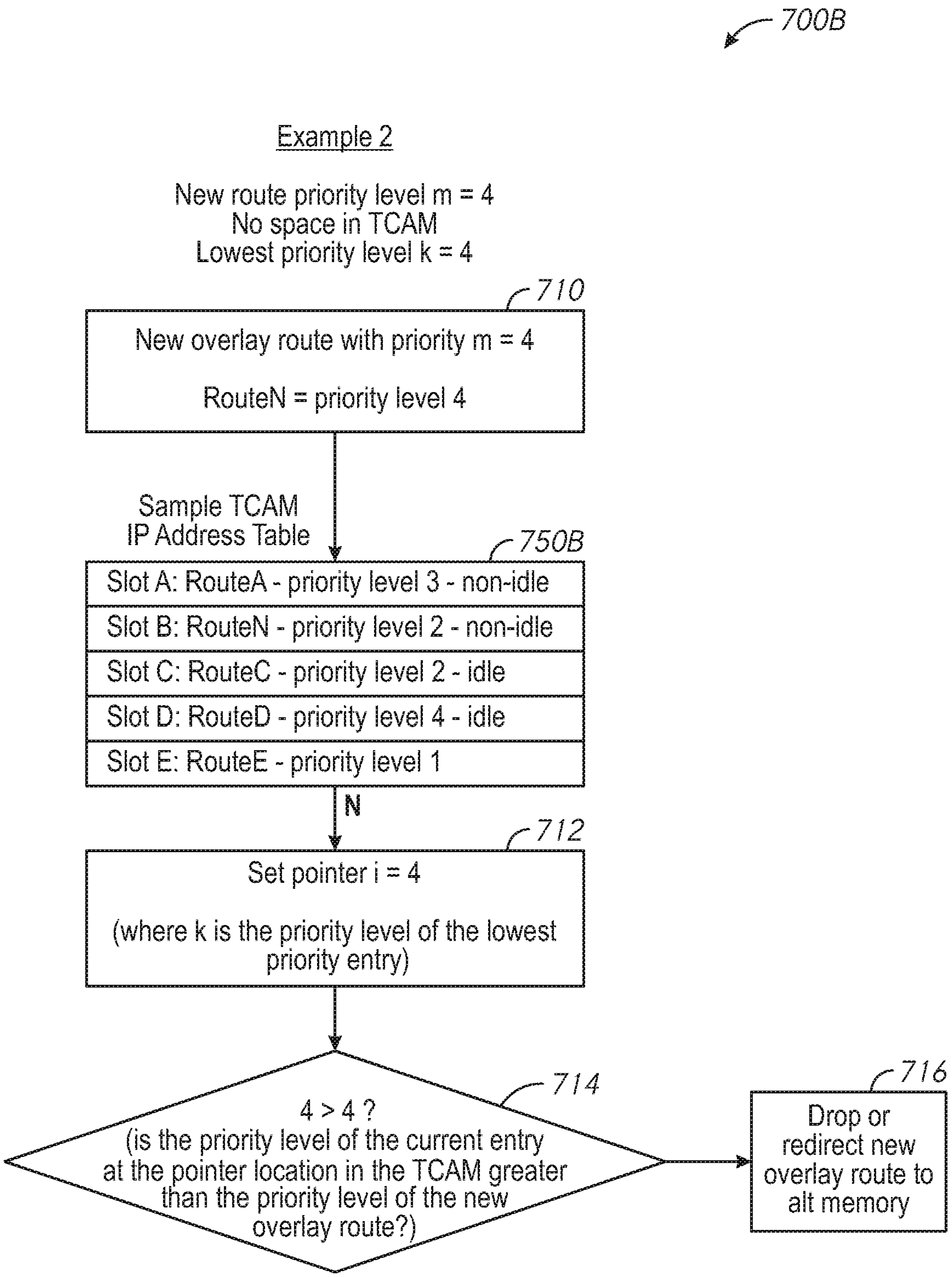

Continuing with a case scenario 700B of FIG. 7B, another new network overlay route "N" may be received or obtained as a candidate for storage in the TCAM (now, a TCAM 750B) (step 710 of FIG. 7B). The candidate route has a priority value indicator of m="4". Also, there is a state or condition for conserving memory space in the TCAM. The pointer "i" is set to point to (and therefore obtain) a priority level indicator "k" of a stored route having the lowest priority in the TCAM (step 712 of FIG. 7B). Here, k=4. It is determined whether k>m (i.e. whether the lowest priority entry in the TCAM has a greater priority than that of the candidate route) (4≥4?) (step 714 of FIG. 7B) (corresponding to step 610 of previous FIG. 6). The result of the determination in step 714 is "No"; therefore, the new route is dropped (or alternatively redirected to alternative memory) (step 716 of FIG. 7B).

Figure 7C:
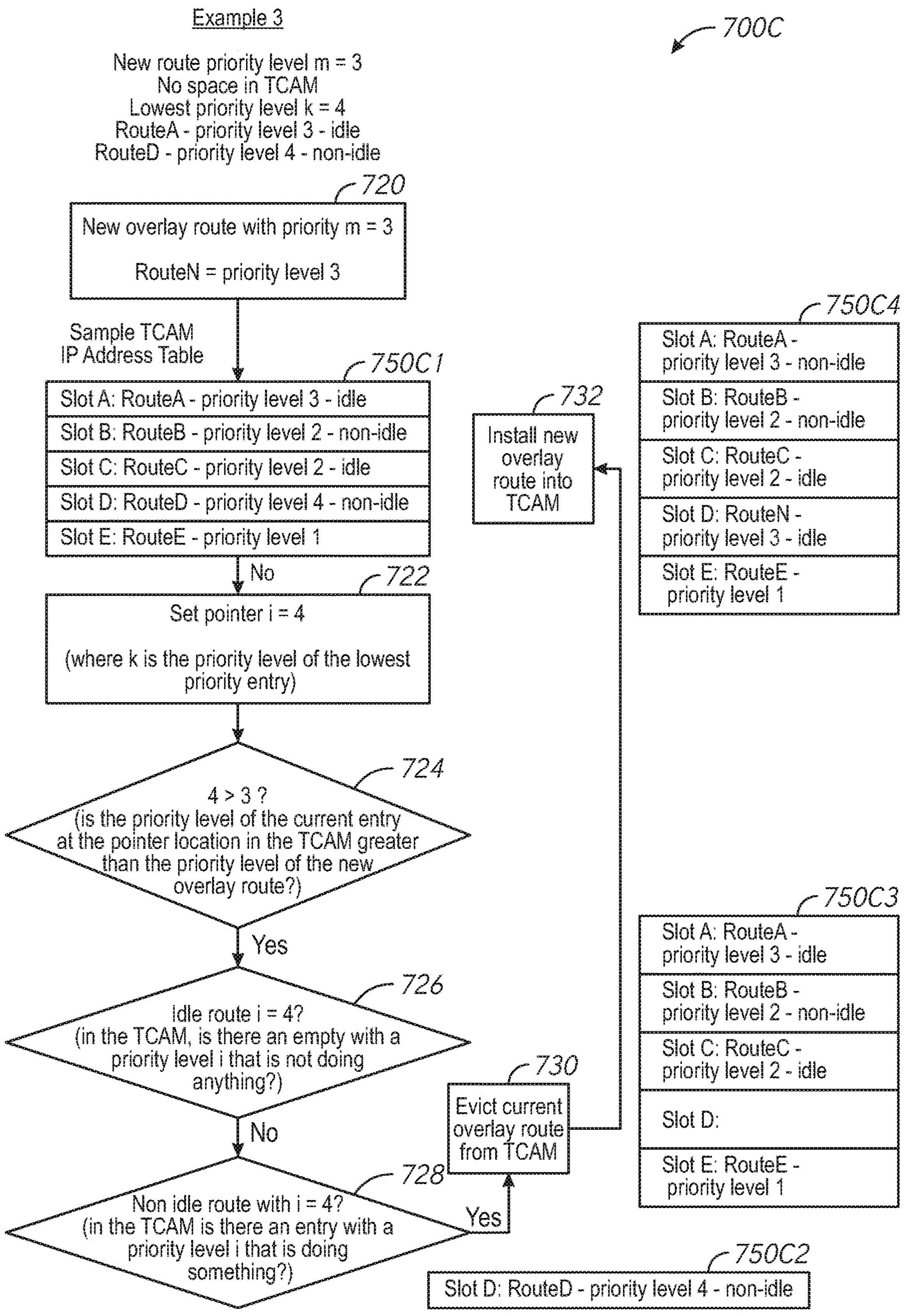

Further continuing with a case scenario 700C of FIG. 7C, another new network overlay route "N" may be received or obtained as a candidate for storage in the TCAM (now, a TCAM 750C1) (step 720 of FIG. 7C). The candidate route has a priority value indicator of m="3". Also, there is a state or condition for conserving memory space in the TCAM. The pointer "i" is set to point to (and therefore obtain) a priority level indicator "k" of a stored route having the lowest priority in the TCAM (step 722 of FIG. 7C). Here, k=4. It is then determined whether k>m (i.e. whether the lowest priority entry in the TCAM has a greater priority than that of the candidate route) (4>3?) (step 724 of FIG. 7C) (corresponding to step 610 of previous FIG. 6). The result of the determination in step 724 is "Yes"; therefore, the technique proceeds to determine whether any one of the stored routes associated with the same priority level is "idle" (step 726 of FIG. 7C) (corresponding to step 614 of previous FIG. 6). The result of the determination in step 726 is "No"; therefore, the technique proceeds to determine whether any one of the stored routes associated with the same priority level is "non-idle" (step 728 of FIG. 7C). The result of the determination in step 728 is "Yes" (Route D in slot D is identified as a non-idle route with priority level="4"); therefore, the technique proceeds to evict one of the existing stored routes from the TCAM (step 730 of FIG. 7C) (see e.g. an updated TCAM 750C3) and store the candidate route in the TCAM (step 732 of FIG. 7C) (see e.g. an updated TCAM 750C4).

Figure 7D:
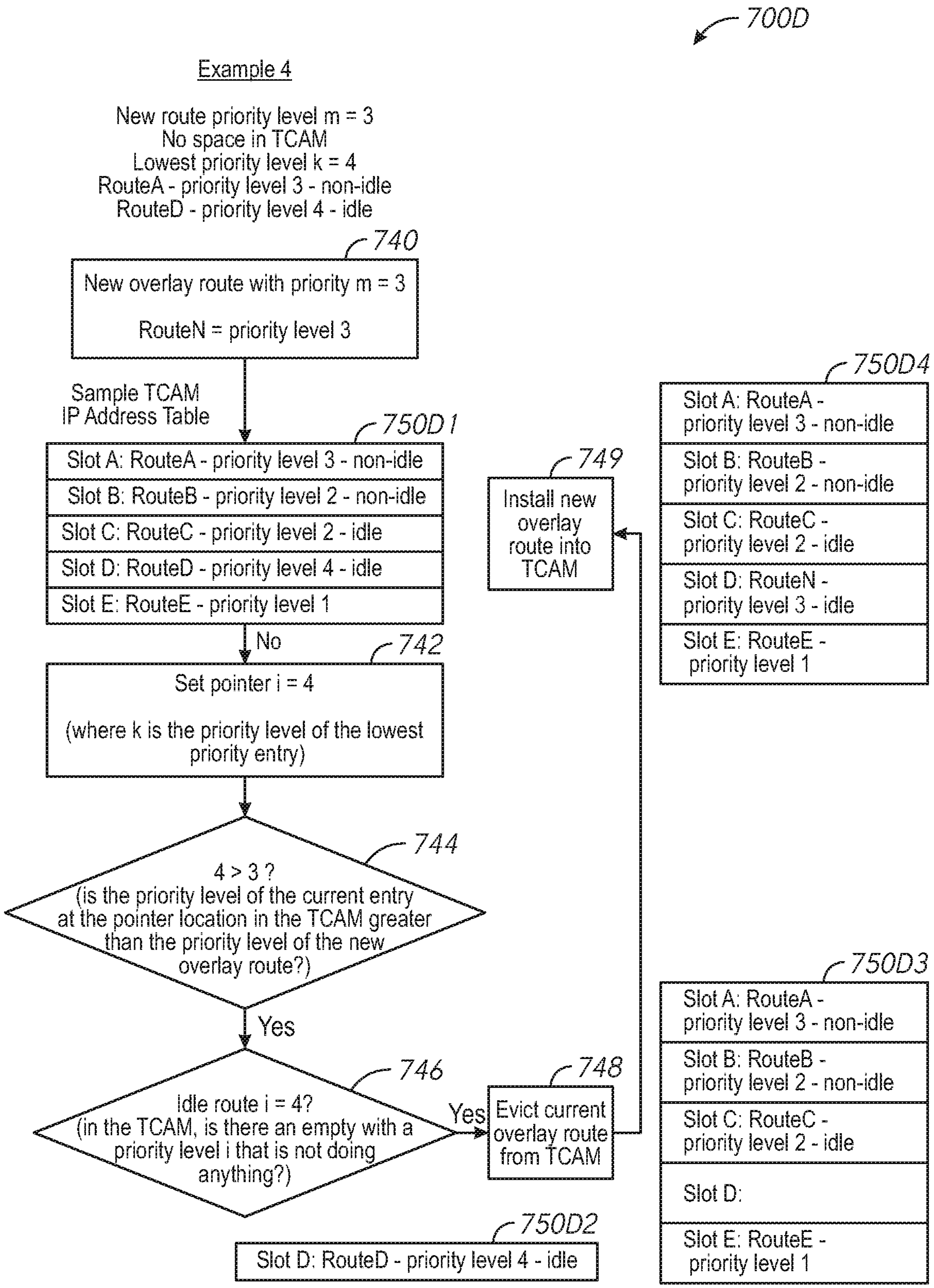

Even further continuing with a case scenario 700D of FIG. 7D, yet another new network overlay route "N" may be received or obtained as a candidate for storage in the TCAM (now, a TCAM 750D1) (step 740 of FIG. 7D). The candidate route has a priority value indicator of m="3". Also, there is a state or condition for conserving memory space in the TCAM. The pointer "i" is set to point to (and therefore obtain) a priority level indicator "k" of a stored route having the lowest priority in the TCAM (step 742 of FIG. 7D). Here, k=4. It is then determined whether k>m (i.e. whether the lowest priority entry in the TCAM has a greater priority than that of the candidate route) (4>3 ?) (step 744 of FIG. 7D) (corresponding to step 610 of previous FIG. 6). The result of the determination in step 744 is "Yes"; therefore, the technique proceeds to determine whether any one of the stored routes associated with the same priority level is "idle" (step 746 of FIG. 7D) (corresponding to step 614 of previous FIG. 6). The result of the determination in step 746 is "Yes" (Route D in slot D is identified as a idle route with priority level="4"); therefore the technique proceeds to evict one of the existing stored routes from the TCAM (step 748 of FIG. 7D) (see e.g. an updated TCAM 750D3) and store the candidate route in the TCAM (step 749 of FIG. 7D) (see e.g. an updated TCAM 750D4).

Again, what may be achieved in the techniques of the present disclosure, and especially in relation to FIGS. 6 and 7A-7D, is that (most) any new route to be considered as a candidate for storage in the TCAM may replace any existing stored route that has a lesser "fallback route support" priority than the candidate route, such that the fallback route support in the router is optimized or maximized.

Thus, router methods and apparatus for managing high-speed memory for the storage of network overlay routes using fallback route support prioritization has been described.

In one illustrative example, a method is performed in a router having one or more processors configured to operate with use of a network overlay protocol to facilitate communications in one or more networks via a network overlay and a high-speed memory for storing a plurality of network overlay routes for forwarding user plane traffic in the one or more networks. In the illustrative method, the router may receive or obtain a network overlay route as a candidate for storage in the memory. The router may perform an assessment for storage of the candidate network overlay route based at least on a priority level indicator of the candidate network overlay route indicative of its fallback route support level in the router. The router may add the candidate network overlay route to the memory or refrain from adding the candidate network overlay route to the memory based on the assessment.

Performing the assessment, and adding or refraining from adding, may be performed in response to identifying a state or condition for conserving memory space of the memory. The state or condition of the memory may be indicative of a memory full or near full. The receiving, the performing, and the adding or refraining from adding, may be repeated regularly, such that the router is filled with network overlay routes to optimize or maximum fallback route support in the router. At least some fallback routes in the router may be for use in forwarding user plane traffic when the router or the network is compromised.

The assessment for storage may be specifically based on the priority level indicator of the candidate network overlay route relative to at least some of the priority level indicators associated with at least some of the stored network overlay routes in the router memory. Adding the candidate network overlay route may involve removing one of the stored network overlay routes from the memory and adding the candidate network overlay route to the memory based on the assessment, which further involves identifying that the priority level indicator of the candidate network overlay route has a greater priority than a priority level indicator of the removed network overlay route indicative of its fallback route support level in the router. Refraining from adding the candidate network overlay route to the memory based on the assessment may further include identifying that the priority level indicator of the candidate network overlay route has a lesser priority than the priority level indicator of the removed network overlay route.

In some implementations, the router may maintain access to a stored mapping between a plurality of route types and a plurality of priority level indicators is maintained, where each route type is associated with a respective one of the priority level indicators in accordance with a fallback route support level of the route type. Here, the router may determine a route type of the candidate network overlay route and identify the priority level indicator of the candidate network overlay route based on the stored mapping and the determined route type. In some implementations, the types of routes may include a default route type, a prefix redirection route type, and one or more level route types.

Each of the stored network overlay routes may be further associated with a route usage level indicator, wherein performing the assessment may be further based on at least some of the route usage level indicators associated with at least some of the stored network overlay routes. In addition, or as an alternative, each of the stored network overlay routes may be further associated with a route age level indicator, wherein performing the assessment may be further based on at least some of the route age level indicators associated with at least some of the stored network overlay routes.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first priority value indicator could be termed a second priority value indicator, and similarly, a second priority value indicator could be termed a first priority value indicator, without changing the meaning of the description, so long as all occurrences of the "first priority value indicator" are renamed consistently and all occurrences of the "second priority value indicator" are renamed consistently. The first priority value indicator and the second priority value indicator are both priority value indicators, but they are not the same priority value indicator.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

obtaining, at a router, a network overlay route as a candidate network overlay route for storage in a memory, wherein the memory stores a plurality of network overlay routes for forwarding user plane traffic in a network;

performing an assessment for storage of the candidate network overlay route based on a priority level indicator of the candidate network overlay route, the priority level indicator being indicative of a fallback route support level of the candidate network overlay route in the router, wherein the priority level indicator of the candidate network overlay route is based on a route type of the candidate network overlay route, wherein performing the assessment for storage of the candidate network overlay route based on the priority level indicator of the candidate network overlay route comprises:

determining a route type of the candidate network overlay route, and identifying the priority level indicator of the candidate network overlay route based on the determined route type and a mapping between a plurality of route types and a plurality of priority level indicators, wherein each route type of the plurality of route types is associated with a respective one of the plurality of priority level indicators in accordance with a respective fallback route support level of the route type; and performing, based on the assessment, at least one of the following: adding the candidate network overlay route to the memory and refraining from adding the candidate network overlay route to the memory.

2. The method of claim 1, wherein adding the candidate network overlay route further comprises:

removing one of the plurality of network overlay routes from the memory and adding the candidate network overlay route to the memory based on the assessment, which includes identifying that the priority level indicator of the candidate network overlay route has a greater priority than the priority level indicator of a removed network overlay route indicative of the fallback route support level in the router.

3. The method of claim 1, wherein refraining from adding the candidate network overlay route further comprises:

refraining from adding the candidate network overlay route to the memory based on the assessment comprising identifying that the priority level indicator of the candidate network overlay route has a lesser priority than the priority level indicator of a removed network overlay route.

4. The method of claim 1, further comprising:

maintaining an access to the mapping between the plurality of route types and the plurality of priority level indicators.

5. The method of claim 4, wherein the plurality of route types comprises a default route type, a prefix redirection route type, and one or more level route types.

6. The method of claim 1, wherein performing the assessment for storage of the candidate route is further based on the priority level indicator of the candidate network overlay route relative to at least some of priority level indicators associated with at least some of the plurality of network overlay routes.

7. The method of claim 1, wherein each of the plurality of stored network overlay routes is associated with a route usage level indicator, and wherein performing the assessment is further based on at least some of route usage level indicators associated with at least some of the plurality of stored network overlay routes.

8. The method of claim 1, wherein each of the plurality of stored network overlay routes is associated with a route age level indicator, and wherein performing the assessment is further based on at least some of the route age level indicators associated with at least some of the plurality of stored network overlay routes.

9. The method of claim 1, wherein the network comprises fallback routes, wherein the fallback routes are for use in forwarding user plane traffic when the network is compromised.

10. The method of claim 1, further comprising:

identifying a state of a memory space of the memory; and performing the assessment in response to identifying the state of the memory state.

11. The method of claim 10, wherein the state is indicative of a memory full or near full.

12. The method of claim 1, wherein the network comprises an endpoint-to-router address mapping.

13. The method of claim 1, wherein the memory comprises a high-speed memory comprising one of the following: a ternary content-addressable memory (TCAM) and a static random access memory (SRAM).

14. The method of claim 1, wherein a network overlay protocol of the network comprises one of the following: a Locator ID/Separation Protocol (LISP), a Virtual Extensible LAN (VXLAN), an Enhanced Virtual Private Network (EVPN), and a Identifier Locator Addressing (ILA).

15. The method of claim 1, further comprising:

repeating performing the assessment to optimize fallback route support in the router.

16. A router device comprising:

a memory for storing a plurality of network overlay routes for forwarding user plane traffic in a network;

a processor connected to the memory, the processor being configured to:

obtain a network overlay route as a candidate network overlay route for storage in the memory;

perform an assessment for storage of the candidate network overlay route, based at least on a priority level indicator of the candidate network overlay route, the priority level indicator indicative of a fallback route support level relative to at least some priority level indicators of at least some of the stored network overlay routes indicative of their fallback route support levels in the router device, wherein the priority level indicator of the candidate network overlay route is based on a route type of the candidate network overlay route, wherein the processor being configured to perform the assessment for storage of the candidate network overlay route based on the priority level indicator of the candidate network overlay route comprises the processor being configured to:

determine a route type of the candidate network overlay route; and identify the priority level indicator of the candidate network overlay route based on the determined route type and a mapping between a plurality of route types and a plurality of priority level indicators, wherein each route type of the plurality of route types is associated with a respective one of the plurality of priority level indicators in accordance with a respective fallback route support level of the route type; and perform, based on the assessment at least one of the following: add the candidate network overlay route to the memory and refrain from adding the candidate network overlay route to the memory.

17. The router device of claim 16, wherein the processor is further configured to:

identify a state of a memory space of the memory; and perform, further based on the identified state of the memory space one of the following: add the candidate network overlay route to the memory and refrain from adding the candidate network overlay route to the memory.

18. The router device of claim 16, wherein each of the plurality of network overlay routes is associated with a route usage level indicator, and wherein the processor is further configured to perform the assessment further based on at least some of the route usage level indicators associated with at least some of the stored network overlay routes.

19. The router device of claim 16, wherein the processor maintains access to the mapping between the plurality of route types and the plurality of priority level indicators.

20. The router device of claim 16, wherein the memory comprises a high-speed memory comprising one of the following: a ternary content-addressable memory (TCAM) and a static random access memory (SRAM).

* * * * *